(12) United States Patent
Philippart

(10) Patent No.: US 9,156,343 B2
(45) Date of Patent: Oct. 13, 2015

(54) ELECTROLYTIC CAPACITOR REFORMATION SYSTEMS AND METHODS

(75) Inventor: Timothy P. Philippart, Orion, MI (US)

(73) Assignee: GM Global Technology Operations LLC, Detroit, MI (US)

(*) Notice: Subject to any disclaimer, the term of this patent is extended or adjusted under 35 U.S.C. 154(b) by 147 days.

(21) Appl. No.: 13/418,878

(22) Filed: Mar. 13, 2012

(65) Prior Publication Data
US 2013/0162183 A1 Jun. 27, 2013

Related U.S. Application Data

(60) Provisional application No. 61/580,517, filed on Dec. 27, 2011.

(51) Int. Cl.
| | |
|---|---|
| H02P 27/00 | (2006.01) |
| H02J 7/00 | (2006.01) |
| B60K 6/28 | (2007.10) |
| H01G 11/20 | (2013.01) |
| H02P 27/06 | (2006.01) |
| H02J 7/34 | (2006.01) |
| B60L 3/00 | (2006.01) |
| B60L 11/00 | (2006.01) |
| B60L 11/18 | (2006.01) |

(52) U.S. Cl.
CPC ............ *B60K 6/28* (2013.01); *B60L 3/0046* (2013.01); *B60L 11/005* (2013.01); *B60L 11/1881* (2013.01); *H01G 11/20* (2013.01); *H02J 7/345* (2013.01); *H02P 27/06* (2013.01); *B60L 2240/529* (2013.01); *B60L 2240/547* (2013.01); *Y02E 60/13* (2013.01); *Y02T 10/642* (2013.01); *Y02T 10/7022* (2013.01); *Y02T 90/34* (2013.01)

(58) Field of Classification Search
USPC ......... 318/400.31, 400.3, 507, 532, 130, 794, 318/796, 751, 817
See application file for complete search history.

(56) References Cited

U.S. PATENT DOCUMENTS

| | | | | |
|---|---|---|---|---|
| 5,569,984 | A * | 10/1996 | Holtslag | 315/307 |
| 6,490,484 | B2 * | 12/2002 | Dooley et al. | 607/5 |
| 2010/0214055 | A1 * | 8/2010 | Fuji et al. | 340/3.1 |
| 2011/0285223 | A1 * | 11/2011 | Miyachi et al. | 310/64 |

* cited by examiner

*Primary Examiner* — Eduardo Colon Santana
*Assistant Examiner* — Iftekhar Mustafa

(57) ABSTRACT

An electrolytic capacitor reformation system for a vehicle includes an electrolytic capacitor, a motor driver module, a switching device, a resistor, and a switching control module. The electrolytic capacitor receives power from a battery of the vehicle. The motor driver module receives power from the electrolytic capacitor and drives an electric motor of the vehicle. The switching device and the resistor are connected in series in a current path between the battery and the electrolytic capacitor. The resistor limits current flow through the current path. The switching control module selectively transitions the switching device to a closed state to reform the electrolytic capacitor.

18 Claims, 3 Drawing Sheets

ELECTROLYTIC CAPACITOR REFORMATION SYSTEMS AND METHODS

CROSS-REFERENCE TO RELATED APPLICATIONS

This application claims the benefit of U.S. Provisional Application No. 61/580,517, filed on Dec. 27, 2011. The disclosure of the above application is incorporated herein by reference in its entirety.

FIELD

The present application relates to vehicles and more particularly to reformation of electrolytic capacitors of vehicle control modules.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle includes various control modules, such as an engine control module (ECM), a transmission control module (TCM), a chassis control module (CCM), and other control modules. Each control module controls a vehicle system. For example, the ECM controls an engine of the vehicle, and the TCM controls a transmission of the vehicle.

One or more of the control modules of the vehicle may control one or more electric motors of the vehicle. Electric motors may be used in, for example, fluid pumps, actuators, propulsion electric motors, starters, and generators and motor generator units. A control module that controls an electric motor controls current flow to the electric motor.

SUMMARY

An electrolytic capacitor reformation system for a vehicle includes an electrolytic capacitor, a motor driver module, a switching device, a resistor, and a switching control module. The electrolytic capacitor receives power from a battery of the vehicle. The motor driver module receives power from the electrolytic capacitor and drives an electric motor of the vehicle. The switching device and the resistor are connected in series in a current path between the battery and the electrolytic capacitor. The resistor limits current flow through the current path. The switching control module selectively transitions the switching device to a closed state to reform the electrolytic capacitor.

An electrolytic capacitor reformation method for a vehicle, includes: receiving power from a battery of the vehicle using an electrolytic capacitor; receiving power from the electrolytic capacitor using a motor driver module; driving an electric motor of the vehicle using the motor driver module; and selectively transitioning a switching device that is connected in series with a resistor in a current path between the battery and the electrolytic capacitor to a closed state to reform the electrolytic capacitor. The resistor limits current flow through the current path.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Capacitors include two electrically conductive plates. Electrolytic capacitors include an oxide that is applied to one of the conductive plates and include the use of an electrolytic material for the dielectric of the capacitor. A control module of a vehicle may include one or more electrolytic capacitors. For example, a control module may include an electrolytic capacitor that is used in controlling power output to an electric motor.

If not used for a period of time, electrolytic capacitors may degenerate. For example, defects may form in the oxide of an electrolytic capacitor when the electrolytic capacitor is not powered for a period of time, such as six months or more. The defects provide paths through the oxide for current to flow (leak) when power is applied.

Defects formed in the oxide of an electrolytic capacitor, however, can be cured through a process known as reformation. A control module of the present application includes an electrolytic capacitor and a current limiting module. The control module selectively reforms the electrolytic capacitor using the current limiting module. More specifically, the control module limits current flow to the electrolytic capacitor via the current limiting module to reform the electrolytic capacitor. Limiting current flow to the electrolytic capacitor reforms the oxide and cures oxide defects. The presence of the current limiting module within the control module eliminates the need for external components (e.g., a trickle charger) to reform the electrolytic capacitor.

Figure 1:
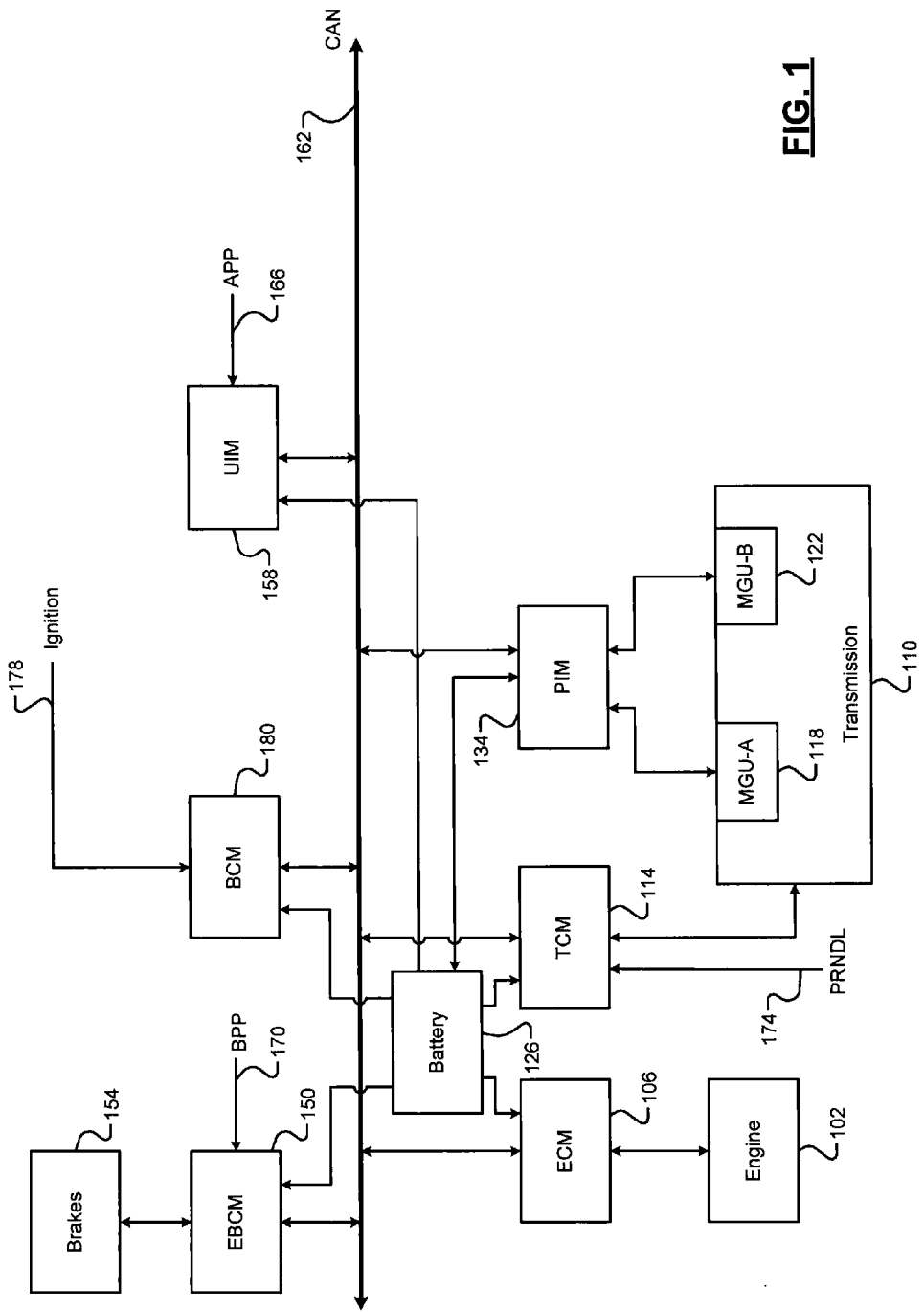
FIG. 1 is a functional block diagram of an example vehicle system according to the present disclosure.

Referring now to FIG. 1, a functional block diagram of an example vehicle system is presented. While a hybrid vehicle system is shown and will be described, the present disclosure is also applicable to non-hybrid vehicles, electric vehicles, fuel cell vehicles, and other types of vehicles that include one or more electric motors.

An engine 102 combusts an air/fuel mixture to generate drive torque. An engine control module (ECM) 106 controls operation of the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. An electric motor controls actuation of the throttle valve. The ECM 106 may also control one or more other electric motors, such as an electric motor of a switchable water pump, an electric oil pump, and other electric motors.

The engine 102 may output torque to a transmission 110. A transmission control module (TCM) 114 controls operation of the transmission 110. For example only, the TCM 114 may control gear selection within the transmission 110 and one or more torque transfer devices (e.g., a torque converter, one or more clutches, etc.) within the transmission 110.

The vehicle may include one or more motors or motor generator units (MGUs). For example only, a first MGU (MGU-A) 118 and a second MGU (MGU-B) 122 may be implemented within the transmission 110 as in the example of FIG. 1. An MGU can act as either a generator or as a motor at a given time. When acting as a generator, an MGU converts mechanical energy into electrical energy. The electrical energy can be, for example, used to charge a battery (or battery pack) 126 and supply electrical energy to electric components of the vehicle. When acting as a motor, an MGU generates torque that may be used, for example, to supplement or replace torque output by the engine 102. While the first and second MGUs 118 and 122 are shown and discussed as being within the transmission 110, one or more electric motors and/or motor generator units that are external to the transmission 110 may be provided additionally or alternatively.

A power inverter control module (PIM) 134 may control the MGU-A 118 and the MGU-B 122. The PIM 134 may be referred to as a transmission power inverter module (TPIM) or a traction power inverter module (TPIM) in various implementations. An electronic brake control module (EBCM) 150 may selectively control brakes 154 of the vehicle. A user interface module (UIM) 158 provides one or more driver inputs to a controller area network (CAN) bus 162. The CAN bus 162 may also be referred to as a car area network bus. The control modules of the vehicle may communicate with each other via the CAN bus 162.

The driver inputs may include, for example, an accelerator pedal position (APP) 166 and one or more other suitable driver inputs. A brake pedal position (BPP) 170 may be provided to the EBCM 150. A position 174 of a park, reverse, neutral, drive lever (PRNDL) may be provided to the TCM 114. The PRNDL position 174 may also be provided to the PIM 134 in various implementations. An ignition state 178 may be provided to a body control module 180. For example only, the ignition state 178 may be input by a driver via an ignition key, button, switch, or other suitable device.

A vehicle may include one or more additional control modules that are not shown, such as a chassis control module, a battery pack control module, etc. One or more of the control modules may be omitted in various vehicles. The control modules may selectively transmit and receive data via the CAN bus 162. In various implementations, two or more control modules may communicate via one or more additional CAN buses (not shown).

Figure 2:
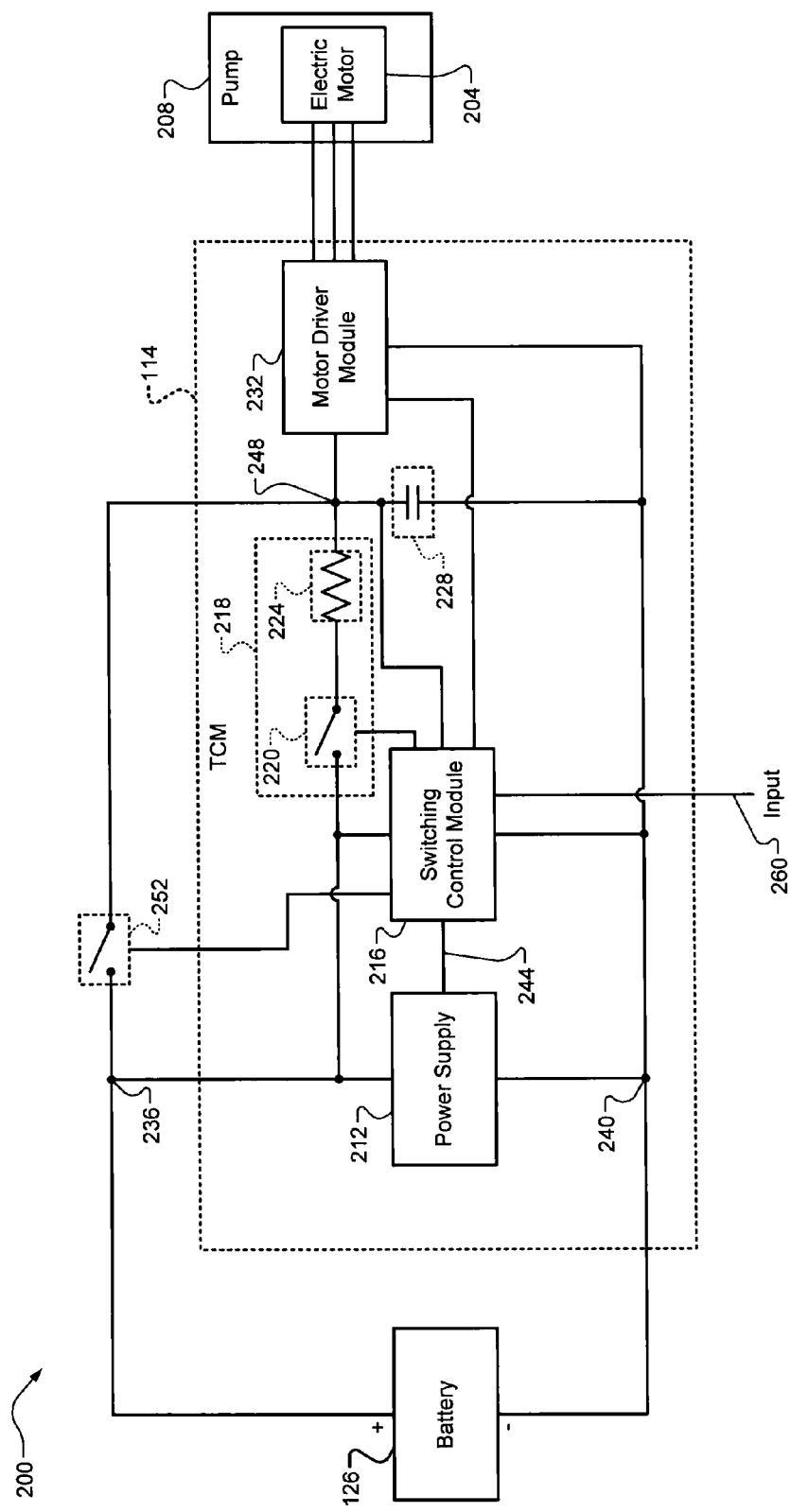
FIG. 2 is a functional block diagram of an example motor control system including a control module and an electric motor according to the present disclosure.

Referring now to FIG. 2, a functional block diagram of an example motor control system 200 is presented. The TCM 114 controls an electric motor 204. For example, the electric motor 204 may be a three-phase electric motor of a pump 208. The pump 208 may include, for example, an auxiliary fluid pump that is selectively turned on to pump a fluid (e.g., oil) when a second, mechanically driven pump (not shown) cannot pump or another suitable type of pump. The second, mechanically driven pump may not be able to pump, for example, when the engine 102 is disabled or when the vehicle is not moving. While the present application will be discussed in conjunction with the TCM 114, the present application is also applicable to other modules of a vehicle that include an electrolytic capacitor that is used, for example, in controlling an electric motor. While the present application will be also discussed in conjunction with the electric motor 204 and the pump 208, the present application is also applicable to other electric motors.

The TCM 114 includes a power supply 212, a switching control module 216, a current limiting module 218, an electrolytic capacitor 228, and a motor driver module 232. The current limiting module 218 may include a first switching device 220 and a current limiting resistor 224. While only the electrolytic capacitor 228 is shown, the electrolytic capacitor 228 may be representative of two or more electrolytic capacitors that are connected in parallel.

A first (e.g., positive) terminal of the battery 126 is connected to a first node 236. In this manner, a first reference potential of the battery 126 is provided at the first node 236. A second (e.g., negative) terminal of the battery 126 is connected to a second node 240. In this manner, a second reference potential of the battery 126 is provided at the second node 240. The first and second reference potentials are different. For example only, the battery 126 may be a 12 Volt battery.

The power supply 212 and the switching control module 216 are connected to the first node 236 and to the second node 240. Based on the output of the battery 126, the power supply 212 outputs a third reference potential 244 (e.g., 5 Volts) to the switching control module 216. The power supply 212 powers the switching control module 216 via the third reference potential 244.

A first terminal of the first switching device 220 is connected to the first node 236, and a second terminal of the first switching device 220 is connected to a first terminal of the current limiting resistor 224. The switching control module 216 controls switching of the first switching device 220 via a switching terminal of the first switching device 220. For example only, the first switching device 220 may include a transistor or another suitable type of switching device.

A second terminal of the current limiting resistor 224 is connected to a third node 248. First and second terminals of a second switching device 252 are connected to the first and third nodes 248, respectively. The switching control module 216 controls switching of the second switching device 252 via a switching terminal of the second switching device 252. For example only, the second switching device 252 may include a relay or another suitable type of switching device.

First and second terminals of the electrolytic capacitor 228 are connected to the second and third nodes 240 and 248, respectively. The motor driver module 232 is connected to the third node 248 and the second node 240. The switching control module 216 controls switching of the motor driver module 232 to control power output to the electric motor 204. The motor driver module 232 outputs power to the electric motor 204 to drive the electric motor 204. The motor driver module 232 may output three-phase power to the electric motor 204. For example only, the motor driver module 232 may include one or more half H-bridges (e.g., three, half H-bridges in the case of a three-phase output).

Electrolytic capacitors, such as the electrolytic capacitor 228, may degenerate when they are not powered for a period of time. For example, defects may form in an oxide of an electrolytic capacitor when the electrolytic capacitor is not powered. The oxide is electrically non-conductive. Oxide defects may refer to places where current can flow (leak) through the oxide. One or more other causes may also cause current leakage, such as post-impregnation effects.

Leakage current increases as oxide defects form. Accordingly, oxide degeneration may cause relatively high leakage current to flow through an electrolytic capacitor when power is applied to the electrolytic capacitor after not being powered for a period of time. The electrolytic capacitor may be damaged by thermal heating caused by high leakage current. Additionally or alternatively, increased current draw from the battery 126 may lead to parasitic current deviations.

The oxide defects, however, can be cured by a process known as reformation. To reform an electrolytic capacitor, current flow to the electrolytic capacitor is limited when power is applied to the electrolytic capacitor. The limitation of current to the electrolytic capacitor allows the oxide to form (i.e., re-form) in the place of oxide defects.

The switching control module 216 of the present disclosure selectively limits current flow to the electrolytic capacitor 228 to reform the electrolytic capacitor 228. The switching control module 216 may reform the electrolytic capacitor 228, for example, in response to receipt of a predetermined input 260. The predetermined input 260 may include, for example, an indicator that an external service tool is connected to the CAN bus 162. The external service tool may be a device that is separate from a vehicle and that can be connected to the vehicle by a vehicle service technician, for example, when the TCM 114 replaced another TCM. The predetermined input 260 may additionally or alternatively include an indicator of a first time that the switching control module 216 has received power or an indicator that the switching control module 216 has not received power in a predetermined period, such as approximately six months or more.

Additionally or alternatively, the switching control module 216 may reform the electrolytic capacitor 228 when an equivalent series resistor (or equivalent series resistance, ESR) is less than a predetermined resistance. The switching control module 216 may close the second switching device 252 to apply power to the electrolytic capacitor 228 for only a predetermined period to determine the ESR of the electrolytic capacitor 228. The switching control module 216 may determine the ESR of the electrolytic capacitor 228, for example, using the equation:

$$ESR_{CAP} = \frac{V_{CAP} * R_{LIMIT}}{V_{BAT} - V_{CAP}},$$

where $ESR_{CAP}$ is the ESR of the electrolytic capacitor 228, $V_{CAP}$ is the voltage of the electrolytic capacitor 228 (the voltage between the second node 240 and the third node 248), $R_{LIMIT}$ is the resistance of the current limiting resistor 224, and $V_{BAT}$ is the voltage of the battery 126 (the voltage between the first node 236 and the second node 240). As an alternative to comparing the ESR of the electrolytic capacitor 228 with the predetermined resistance, the switching control module 216 may reform the electrolytic capacitor 228 when the leakage current is greater than a predetermined current. The switching control module 216 may determine the leakage current, for example, by dividing the voltage of the battery 126 by the ESR of the electrolytic capacitor 228.

The first and second switching devices 220 and 252 may default to an open state. To reform the electrolytic capacitor 228, the switching control module 216 first transitions the first switching device 220 to a closed state and maintains the second switching device 252 in an open state. The current limiting resistor 224 limits current flow to the electrolytic capacitor 228 (relative to when the second switching device 252 is in the closed state) to reform the electrolytic capacitor 228.

The switching control module 216 may maintain the first switching device 220 in the closed state or modulate the first switching device 220 between the open and closed states during reformation of the electrolytic capacitor 228. For example only, the switching control module 216 may switch the first switching device 220 between the open and closed states using pulse width modulation (PWM). The switching control module 216 may control the duty cycle of the first switching device 220, for example, as a function of the leakage current. For example only, the switching control module 216 may increase the duty cycle of the first switching device 220 as the leakage current decreases and vice versa. Varying the duty cycle as a function of the leakage current may be performed to regulate the temperature of the electrolytic capacitor 228. Heating of the electrolytic capacitor 228 may increase as the leakage current increases, and vice versa.

The switching control module 216 may determine whether the reformation is complete and transition the first switching device 220 to the open state when the reformation is complete. The switching control module 216 may determine whether the reformation is complete based on a comparison of the leakage current and a predetermined current. For example only, the switching control module 216 may determine that the reformation is complete when the leakage current is less than a predetermined current.

The switching control module 216 may additionally or alternatively determine whether the reformation is complete based on a comparison of the voltage of the electrolytic capacitor 228 and the voltage of the battery 126. For example only, the switching control module 216 may determine that the reformation is complete when a difference between the voltage of the battery 126 and the voltage of the electrolytic capacitor 228 is less than a predetermined voltage. The predetermined voltage may be approximately 2 Volts or another suitable voltage.

When the reformation is complete, the switching control module 216 transitions the first switching device 220 to the open state. Once the first switching device 220 is in the open state, the switching control module 216 may transition the second switching device 252 to the closed state. When the second switching device 252 is in the closed state, current flow to the electrolytic capacitor 228 is no longer limited. When the second switching device 252 is in the closed state, the switching control module 216 may begin switching the motor driver module 232 to drive the electric motor 204.

Figure 3:
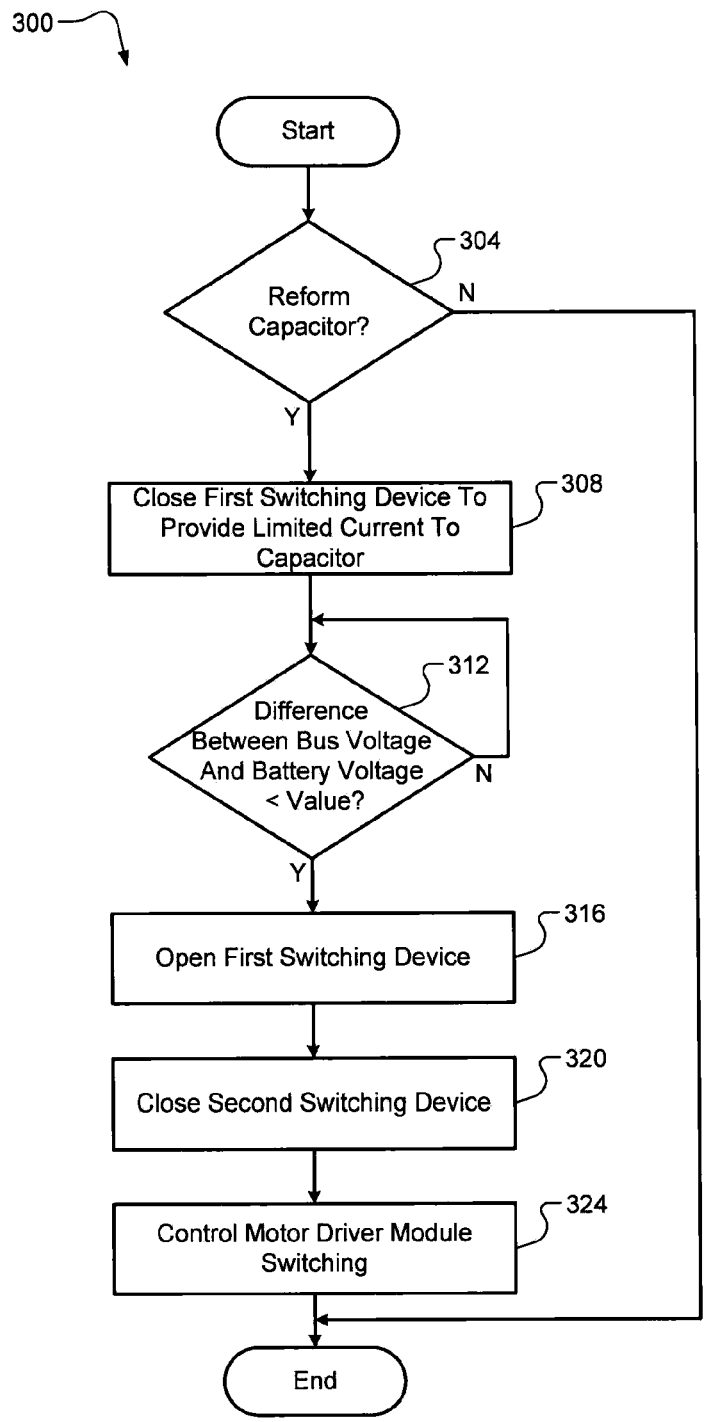
FIG. 3 is a flowchart depicting an example method of controlling reformation of an electrolytic capacitor of a control module according to the present disclosure.

Referring now to FIG. 3, a flowchart depicting an example method 300 of reforming the electrolytic capacitor 228 is presented. The first and second switching devices 220 and 252 are in the open state when control begins. Control may begin with 304 where control determines whether to reform the electrolytic capacitor 228. If so, control continues with 308; if false, control may end.

Control may reform the electrolytic capacitor 228, for example, in response to the predetermined input 260 indicating that a service tool is connected to the CAN bus 162, in response to the predetermined input 260 indicating that the switching control module 216 has not previously received power, or in response to the predetermined input 260 indicating that the switching control module 216 has not received power for at least the predetermined period. Additionally or alternatively, control may reform the electrolytic capacitor 228 in response to a determination that the ESR of the electrolytic capacitor 228 is less than the predetermined resistance and/or that the leakage current is greater than the predetermined current.

At 308, control transitions the first switching device 220 to the closed state to limit current flow to the electrolytic capacitor 228 for reformation. Current flow to the electrolytic capacitor 228 is limited relative to when the second switching device 252 is in the closed state. Control may switch the first switching device 220 between the open and closed states (e.g., using PWM) to limit current flow.

At 312, control may determine whether the difference between the voltage of the battery 126 and the voltage of the electrolytic capacitor 228 is less than the predetermined voltage. Control may additionally or alternatively determine whether the leakage current is less than the predetermined current at 312. If true, reformation of the electrolytic capacitor 228 may be deemed complete, and control may continue with 316. If false, control may continue limiting current flow to the electrolytic capacitor 228 for reformation and remain at 312.

When the reformation of the electrolytic capacitor 228 is complete, control transitions the first switching device 220 to the open state at 316, and control may proceed to 320. At 320, control transitions the second switching device 252 to the closed state. In this manner, current flow to the electrolytic capacitor 228 is no longer limited. The electrolytic capacitor 228, however, has already been reformed and has already received some charge during the reformation. At 324, control begins switching the motor driver module 232 to drive the electric motor 204. The motor driver module 232 draws power from the electrolytic capacitor 228 to drive the electric motor 204.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. An electrolytic capacitor reformation system for a vehicle, comprising:
   an electrolytic capacitor that receives power from a battery of the vehicle, wherein defects form in an oxide of the electrolytic capacitor when the electrolytic capacitor has not received power for at least a predetermined period;
   a motor driver module that receives power from the electrolytic capacitor and that drives an electric motor of the vehicle;
   a switching device and a resistor that are connected in series in a current path between the battery and the electrolytic capacitor, wherein the resistor limits current flow through the current path; and
   a switching control module that varies a duty cycle of the switching device as a function of a leakage current through the electrolytic capacitor to cure defects formed in the oxide of the electrolytic capacitor and,
   wherein the switching control module determines an equivalent series resistance (ESR) of the electrolytic capacitor and initiates curing of the defects formed in the oxide of the electrolytic capacitor in response to a determination that the ESR of the electrolytic capacitor is less than a predetermined resistance.

2. The electrolytic capacitor reformation system of claim 1 wherein the switching control module controls the duty cycle of the switching device to cure defects formed in the oxide of the electrolytic capacitor in response to an indication that the electrolytic capacitor has not received power for a period greater than the predetermined period.

3. The electrolytic capacitor reformation system of claim 1 further comprising a pump that includes the electric motor and that pumps fluid when driven by the electric motor.

4. The electrolytic capacitor reformation system of claim 1 wherein the switching control module selectively transitions the switching device to an open state in response to a determination that the curing of defects formed in the oxide of the electrolytic capacitor is complete.

5. The electrolytic capacitor reformation system of claim 4 wherein the switching control module determines that the curing of defects formed in the oxide of the electrolytic capacitor is complete when a difference between a voltage of the battery and a voltage of the electrolytic capacitor is less than a predetermined voltage.

6. The electrolytic capacitor reformation system of claim 4 further comprising a second switching device that is connected in a second current path between the battery and the electrolytic capacitor.

7. The electrolytic capacitor reformation system of claim 6 wherein the switching control module selectively transitions the second switching device to a closed state after transitioning the switching device to the open state.

8. The electrolytic capacitor reformation system of claim 7 wherein the switching control module begins switching switches of the motor driver module after transitioning the second switching device to the closed state.

9. An electrolytic capacitor reformation method for a vehicle, comprising:
   receiving power from a battery of the vehicle using an electrolytic capacitor, wherein defects form in an oxide of the electrolytic capacitor when the electrolytic capacitor has not received power for at least a predetermined period;

receiving power from the electrolytic capacitor using a motor driver module;

driving an electric motor of the vehicle using the motor driver module;

varying a duty cycle of a switching device that is connected in series with a resistor in a current path between the battery and the electrolytic capacitor as a function of a leakage current through the electrolytic capacitor to cure defects formed in the oxide of the electrolytic capacitor, wherein the resistor limits current flow through the current path;

determining an equivalent series resistance (ESR) of the electrolytic capacitor; and initiating the curing of the defects formed in the oxide of the electrolytic capacitor in response to a determination that the ESR of the electrolytic capacitor is less than a predetermined resistance.

10. The electrolytic capacitor reformation method of claim 9 further comprising controlling the duty cycle of the switching device to cure defects formed in the oxide of the electrolytic capacitor in response to an indication that the electrolytic capacitor has not received power for a period greater than the predetermined period.

11. The electrolytic capacitor reformation method of claim 9 further comprising driving a fluid pump using the electric motor.

12. The electrolytic capacitor reformation method of claim 9 further comprising selectively transitioning the switching device to an open state in response to a determination that the curing of the defects formed in the oxide of the electrolytic capacitor is complete.

13. The electrolytic capacitor reformation method of claim 12 further comprising determining that the curing of the defects formed in the oxide of the electrolytic capacitor is complete when a difference between a voltage of the battery and a voltage of the electrolytic capacitor is less than a predetermined voltage.

14. The electrolytic capacitor reformation method of claim 12 further comprising selectively transitioning a second switching device that is connected in a second current path between the battery and the electrolytic capacitor to a closed state.

15. The electrolytic capacitor reformation method of claim 14 further comprising selectively transitioning the second switching device to the closed state after transitioning the switching device to the open state.

16. The electrolytic capacitor reformation method of claim 15 further comprising beginning switching switches of the motor driver module after transitioning the second switching device to the closed state.

17. The electrolytic capacitor reformation method of claim 9 wherein the predetermined period is at least 6 months.

18. The electrolytic capacitor reformation system of claim 1 wherein the predetermined period is at least 6 months.

* * * * *